Aug. 30, 1927.

J. A. LOCKHART 1,640,947

AUTOMATIC SHUT-OFF

Filed Feb. 12, 1926  2 Sheets-Sheet 1

Inventor
James A. Lockhart
by Roberts, Cushman & Woodberry
Att'ys

Aug. 30, 1927.　　J. A. LOCKHART　　1,640,947

AUTOMATIC SHUT-OFF

Filed Feb. 12, 1926　　2 Sheets-Sheet 2

Inventor
James A. Lockhart
by Roberts, Cushman & Woodbury.
Att'ys

Patented Aug. 30, 1927.

1,640,947

UNITED STATES PATENT OFFICE.

JAMES A. LOCKHART, OF REVERE, MASSACHUSETTS.

AUTOMATIC SHUT-OFF.

Application filed February 12, 1926. Serial No. 87,821.

This invention relates to means for controlling the flow of liquids from supply pipes and particularly to apparatus for opening a valve to permit the flow of water, in combination with mechanism for automatically shutting off the flow from the valve.

A principal object of the invention is the provision of improved means for automatically closing a valve when the water level in a reservoir to be filled from the supply pipe has reached a predetermined height. Additional features of construction and arrangement of elements will be explained in the accompanying description and pointed out in the appended claims.

The subject matter of this invention may be utilized in connection with any reservoir or basin which normally contains a quantity of liquid and which has associated therewith a supply pipe and a discharge pipe; but for the purpose of the present description, the invention will be explained as embodied in a preferred construction for use in flush-tanks of customary type.

The preferred construction is illustrated in the accompanying drawings, in which.

Figure 1:
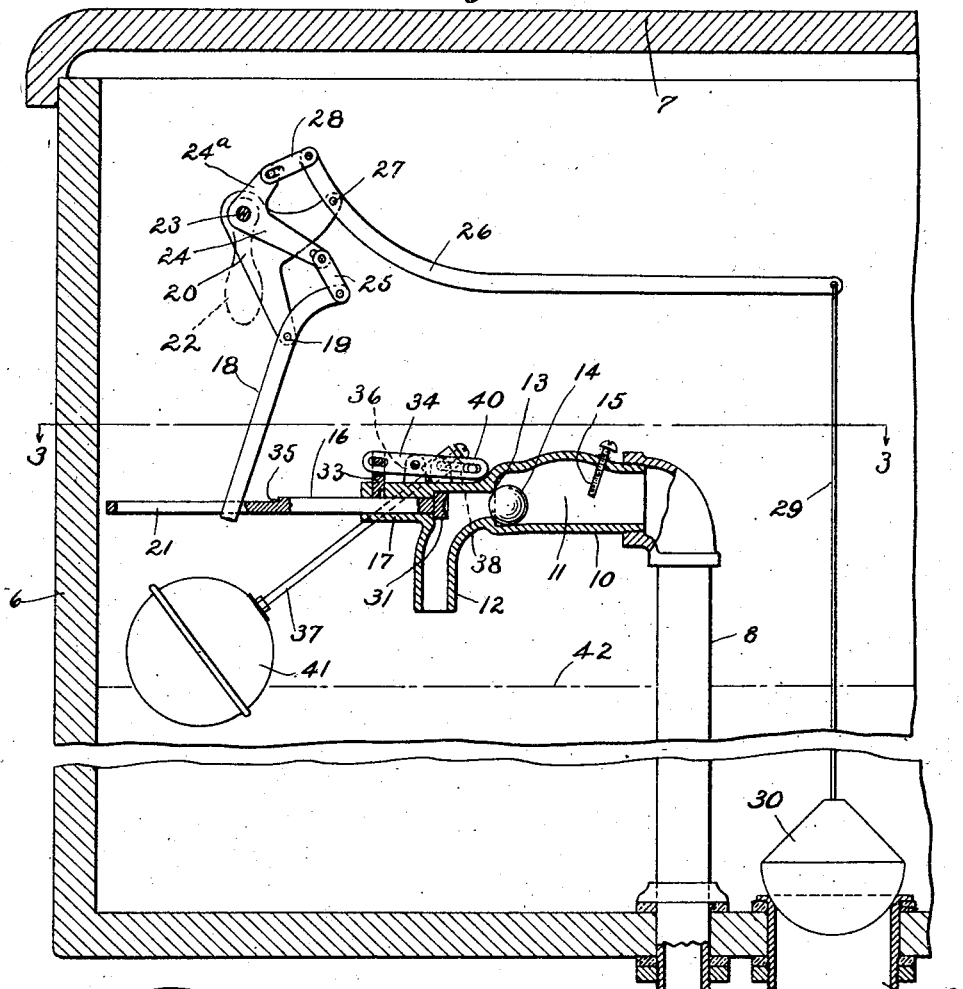
Fig. 1 is a side elevation of apparatus embodying the invention with portions of the apparatus in section.

Apparatus constructed in accordance with this invention comprises essentially a valve casing having a passage through which liquid flows to a basin or reservoir, said valve casing housing a freely movable valve adapted to seat to shut off the flow of water therethrough, means for moving the valve away from its seat and for holding it off of its seat to permit the flow of water to the reservoir, and means operable upon the accumulation of water within the reservoir to release the valve to permit the pressure of the water within the casing to seat the valve.

The reservoir or basin is represented by the flush-tank 6 which may have a cover 7 and which is provided with a supply pipe 8 and a discharge pipe 9. A valve casing 10 having a substantially horizontal passage 11, a downwardly directed nozzle 12 and an intermediate annular valve seat 13, is fixed upon the end of the supply pipe 8, and within the passage 11 is a ball valve 14 which is freely movable toward and from the seat 13. Pressure of water within the supply pipe normally holds the ball valve in seated position, effectually shutting off the flow of water from the nozzle 12. In case the water in the supply pipe is cut off, a check screw 15 extending into the passage 11 prevents the ball 14 from rolling into the supply pipe. The screw may be fixed in position by a lock nut and washer, but in order to prevent leakage it is preferred to solder the screw in place, as shown.

The mechanism for moving the ball valve 14 away from its seat to permit the flow of water includes a rod 16 slidable longitudinally of the passage 11 in a guide sleeve 17 integral with the casing 10 and projecting horizontally in line with passage 11 from a point near the junction of the nozzle 12 with the casing proper. The rod 16 is actuated by a lever 18 pivoted at 19 to a fixed bracket 20, the free end of the lever extending into an elongate vertical slot 21 in the rod 16. Lever 18 is operated by a handle 22 at the outside of the tank, the handle being secured to a shaft 23 journalled in an opening in the wall of the tank. The shaft carries a bell-crank lever comprising an arm 24 inside of the tank, and this arm is pivotally connected to a link 25 which is pivoted to the upper arm of lever 18.

The other arm 24ª of the bell-crank lever is connected by a link to a second lever 26, pivoted at 27 to the fixed member 20. The free end of lever 26 is joined by a bail 29 to a flush valve 30 which is adapted to seat in the mouth of the discharge pipe 9. The levers, links and arm 24 are constructed and arranged in a well-known manner to permit movement of the handle 22 in either direction to operate both levers simultaneously, the free end of lever 18 moving to the right of the drawing until the position of Fig. 2 is assumed, and the free end of lever 26 moving upwardly to raise valve 30 from its seat.

Figure 2:
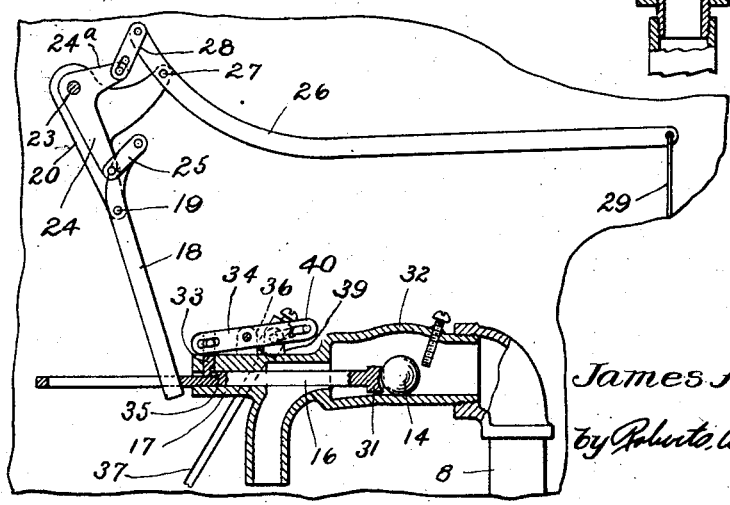
Fig. 2 is a fragmentary view showing certain elements disclosed in Fig. 1 but in a different position.
Figure 3:
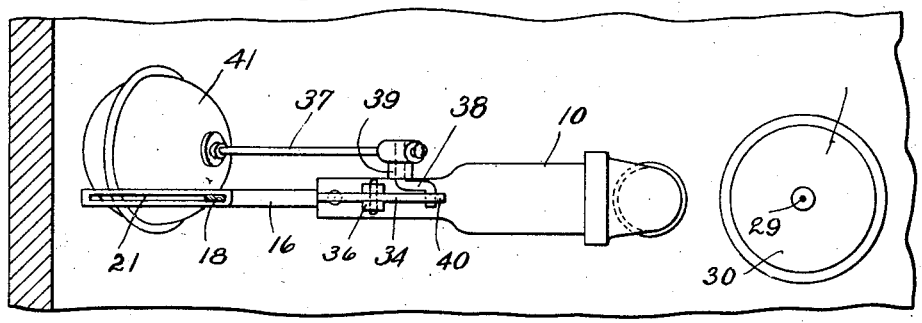
Fig. 3 is a section on the line 3—3 of Fig. 1.

Said movement of the lever 18 pushes rod 16 toward the ball 14 and carries the latter away from its seat to the position of Fig. 2, permitting the flow of water through the valve casing. The inner end of rod 16 is preferably provided with an enlarged head 31 having its forward face spherically concave to conform to the surface of ball 14. When the valve is closed the head 31 abuts shoulders at the inner end of sleeve 17 to prevent outward retraction of the rod through the sleeve. The passage 11 may be enlarged at 32 to ensure a free supply of water around the ball 14 when the valve is open.

In order to hold the ball valve 14 offseat after the handle 22 is released, a pawl 33, suspended from one end of a rock lever 34, slides downwardly within a radial guide orifice in sleeve 17 and engages at its lower end with a latch shoulder 35 in the rod 16 (Fig. 2). Lever 34 is fulcrumed between upwardly projecting lugs 36 and is rocked by means of a weighted rod 37 to which it is connected at one end by a Z-shaped crank member 38. The crank member 38 is trunnioned in an upwardly projecting boss 39, one end thereof being fixed to rod 37 and the other end or crank passing loosely through a hole at the end 40 of bar 34. Rod 37 is weighted by the hollow ball 41 which also serves as a float as hereinafter explained. Downward movement of the weighted end of rod 37 causes the end 40 of bar 34 to be raised, depressing the pawl 33 to engage shoulder 35 of rod 16 as aforesaid; while movement of rod 37 in the opposite direction lifts pawl 33 from said engagement. In its normal position the lower end of rod 37 is raised by the float 41 sufficiently to hold pawl 33 in retracted position as shown in Fig. 1, the water in the tank or reservoir being normally at the level 42.

The operation of this arrangement is exceedingly simple and ensures a minimum possibility that the movable elements will get out of order. Manual movement of handle 22 in either direction causes levers 26 and 18 respectively to open the flush valve 30, permitting the water in the tank to drain through discharge pipe 9, and to cause rod 16 to open ball valve 14, allowing an influx of water from supply pipe 8 through passage 11 and nozzle 12 to the tank. At the same time, since the discharge pipe is substantially larger in diameter than the supply pipe, the water level in the tank will rapidly be lowered, carrying the float 41 downward and depressing pawl 33 to engage shoulder 35 and thus hold ball valve 14 offseat. When the tank has been sufficiently exhausted of water, check valve 30 will be closed automatically by its own weight and the suction of water through pipe 9, and the lever 18 will be restored to normal position, its lower end having freedom of movement in the slot 21 which is of sufficient length to permit said movement without the exertion of pressure on the pawl.

As the tank is refilled with water, the float will rise, ultimately retracting pawl 33 from engagement and unlocking rod 16. Water pressure in chamber 11 will then forcibly close ball valve 14, at the same time giving rod 16 sufficient impetus to return it to its original position. Thus it will be seen that the seating of valve 14 is positively ensured by the pressure of water in the supply pipe and is not dependent upon the closing of a valve by the float rod 37, as in the prevailing type of apparatus.

Although a preferred type of apparatus embodying this invention has been specifically described herein, it will be apparent that variations in structural details may be utilized as desired without departing from the spirit of the invention as defined in the appended claims.

I claim:

1. A supply valve for liquids comprising a casing having a restricted opening constituting a valve seat, a ball valve loose within the casing normally closing said valve seat by pressure of the liquid thereon, a rod slidable longitudinally through said opening in the direction of the path of motion of the ball valve, means for moving the rod to force the ball valve off seat, a pawl carried by the casing adapted automatically to engage the rod to hold the valve open, and means for releasing the pawl whereby the ball valve suddenly closes by pressure of the liquid.

2. A supply valve for liquids comprising a casing having a restricted opening constituting a valve seat, a ball valve loose within the casing normally closing said valve seat by pressure of the liquid thereon, a rod slidable longitudinally through said opening in the direction of the path of motion of the ball valve, said rod having a depressed shoulder intermediate its ends, means for moving the rod through said opening to force the ball valve off seat, a pawl movable into engagement with said shoulder to hold said valve open, and means for releasing the pawl from engagement with said shoulder whereby the valve is permitted suddenly to close by pressure of the liquid.

3. In a reservoir for liquids having a supply pipe and a discharge pipe, a valve casing connected with the supply pipe having a restricted opening constituting a valve seat, a supply valve normally closed upon said seat, a rod slidable longitudinally through said opening to open the valve, a valve normally closing the discharge pipe, means for concomitantly opening said discharge valve and moving said rod to force the supply valve off seat, a pawl carried by the casing adapted automatically to engage the rod upon the operation of said means to hold the valve off seat, and means operable upon the accumulation of liquid within the reservoir to release said pawl from engagement with the rod, whereby the valve is suddenly closed by pressure of the liquid.

4. In a reservoir for liquids having a supply pipe and a discharge pipe, a valve casing connected with the supply pipe having a restricted opening constituting a valve seat, a ball valve loose within the casing normally closing said valve seat by pressure of the liquid thereon, a rod slidable longitudinally through said opening in the direction of the path of motion of the ball valve to open said valve, said rod having a depressed shoulder intermediate its ends, a valve normally closing the discharge pipe, means for concomitantly opening said discharge valve and moving said rod to force the ball valve off seat, a pawl movable into engagement with said shoulder to hold said valve open, and means operable upon the accumulation of liquid within the reservoir to release the pawl from said engagement, whereby the ball valve is suddenly closed by pressure of the liquid.

5. In a reservoir for liquids having a supply pipe and a discharge pipe, a casing connected with the supply pipe, a ball valve freely movable in the casing but normally seated by pressure of the liquid within the casing thereupon, a flush valve normally closing the discharge pipe, a rod slidable longitudinally through the casing in the direction of the path of motion of said ball valve, said rod having a depressed shoulder intermediate its ends and an elongate slot adjacent to its outer end, a lever pivoted for swinging movement, one end of the lever entering said slot, means for concomitantly opening said flush valve and for moving said lever to cause the rod to force the ball valve off of its seat, a pawl movable into engagement with said shoulder when the ball valve is open to hold said valve off of its seat thereby permitting the flow of liquid through the casing, the lever moving freely longitudinally of the slot in the rod as the flush valve returns to closed position, a float, and means actuable thereby for releasing the pawl from engagement with said shoulder when the float is raised by the accumulation of liquid within the reservoir, whereby the ball valve is permitted to close by the force of the liquid from the supply pipe.

Signed by me at Revere, Massachusetts, this 9th day of February, 1926.

JAMES A. LOCKHART.